(12) United States Patent
Harrang et al.

(10) Patent No.: US 7,684,365 B2
(45) Date of Patent: Mar. 23, 2010

(54) HALF DUPLEX FREQUENCY DIVISION DUPLEX SCHEDULING

(75) Inventors: Jeffrey Paul Harrang, Sammamish, WA (US); Eamonn Gormley, Redmond, WA (US); Adrian Yip, Snohomish, WA (US)

(73) Assignee: SR Telecom & Co., S.E.C., Quebec (CA)

( * ) Notice: Subject to any disclaimer, the term of this patent is extended or adjusted under 35 U.S.C. 154(b) by 278 days.

(21) Appl. No.: 11/951,791

(22) Filed: Dec. 6, 2007

(65) Prior Publication Data

US 2008/0212501 A1 Sep. 4, 2008

Related U.S. Application Data

(60) Provisional application No. 60/868,779, filed on Dec. 6, 2006.

(51) Int. Cl.
*H04Q 7/00* (2006.01)
(52) U.S. Cl. ........................ 370/329; 370/468
(58) Field of Classification Search ................. 370/277, 370/281, 328, 329, 338, 465, 468
See application file for complete search history.

(56) References Cited

U.S. PATENT DOCUMENTS

| 5,420,851 | A | * | 5/1995 | Seshadri et al. | 370/280 |
| 5,594,720 | A | * | 1/1997 | Papadopoulos et al. | 370/330 |
| 5,729,541 | A | * | 3/1998 | Hamalainen et al. | 370/337 |
| 6,141,336 | A | * | 10/2000 | Bauchot et al. | 370/348 |
| 6,480,483 | B2 | * | 11/2002 | Yahata et al. | 370/350 |
| 6,870,821 | B2 | * | 3/2005 | Sebire | 370/328 |
| 7,522,924 | B2 | * | 4/2009 | Abeta et al. | 455/452.2 |
| 7,580,387 | B2 | * | 8/2009 | Kayama et al. | 370/329 |
| 2007/0147333 | A1 | * | 6/2007 | Makhijani | 370/347 |
| 2007/0293214 | A1 | * | 12/2007 | Ansari et al. | 455/427 |

* cited by examiner

*Primary Examiner*—Ricky Ngo
*Assistant Examiner*—Christine Ng
(74) *Attorney, Agent, or Firm*—Sean P. O'Hanlon, Esq., PLLC

(57) ABSTRACT

A method, computer program, and a wireless system for scheduling half duplex frequency division duplex bursts includes populating a burst frame having an uplink sub-frame and a downlink sub-frame with one or more block pairs, each block pair including an uplink block and a down link block. Populating the burst frame includes identifying a largest unscheduled block pair, and appending one of the uplink block and the downlink block of the identified block pair to a shortest sub-frame string. Populating the burst frame also includes appending the other of the uplink block and the downlink block to a diagonally opposed sub-frame string. The method also includes determining if a conflict exists between the uplink block and the downlink block for each scheduled block pair.

20 Claims, 5 Drawing Sheets

HALF DUPLEX FREQUENCY DIVISION DUPLEX SCHEDULING

CROSS-REFERENCE TO RELATED APPLICATIONS

This application claims the benefit of U.S. provisional patent application Ser. No. 60/868,779, filed Dec. 6, 2006, the entire disclosure of which is incorporated by reference.

FIELD

The present disclosure relates to wireless networks, and more particularly to half duplex frequency division duplex (H-FDD) scheduling.

BACKGROUND

Half duplex frequency division duplex (H-FDD) is the application of both time division multiplexing and frequency division multiplexing to separate events, such as uplink and downlink transmissions. The uplink and downlink transmissions utilize separate frequency bands, such that the uplink transmissions occur within one frequency band and the downlink transmissions occur within another frequency band, thereby providing a frequency offset between the uplink and downlink transmissions. Additionally, H-FDD employs a time offset between the uplink and downlink transmissions, such that the uplink and downlink transmissions occur in different time frames. H-FDD emulates full duplex communication over half duplex communication links. Even though the uplink and downlink transmissions use separate frequency bands, H-FDD subscriber stations may only be capable of transmitting or receiving at any given time. Therefore, uplink and downlink transmissions must be scheduled to avoid time-wise conflicts.

SUMMARY

According to an implementation, a method may include populating a burst frame having an uplink sub-frame and a downlink sub-frame with at least a plurality of block pairs, in which each block pair includes an uplink block and a down link block. Populating the burst frame may include identifying a largest unscheduled block pair, and appending one of the uplink block and the downlink block of the identified block pair to a shortest sub-frame string. The other of the uplink block and the downlink block may be appended to a diagonally opposed sub-frame string. The method also includes determining if a conflict exists between the uplink block and the downlink block for each scheduled block pair.

One or more of the following features may also be included. Determining if a conflict exists between the scheduled uplink and downlink block may include determining if the uplink block and the downlink block of one of the plurality of block pairs at least partially overlap in the burst frame. If a conflict exists, the conflict may be resolved and a next largest block pair may be scheduled. Resolving the conflict may include inserting a corresponding one of the uplink block and the downlink block at a beginning of the diagonally opposed sub-frame string, with the diagonally opposed sub-frame string appended to the inserted corresponding one of the uplink block and the downlink block. The other of the uplink block and the downlink block may be appended to the shortest sub-frame string.

An unpaired uplink block or an unpaired downlink block may be scheduled after scheduling the plurality of block pairs. Additionally, the method may further include determining the combined length of each of the plurality of block pairs. Determining the combined length of each of the plurality of block pairs may include arranging the block pairs according to combined length of the uplink block and the downlink block of each of the plurality of block pairs.

According to another implementation, a computer program product residing on a computer readable medium may have a plurality of instructions stored thereon that, when executed by a processor, cause the processor to perform operations including populating a burst frame having an uplink sub-frame and a downlink sub-frame with at least a plurality of block pairs. Each block pair may include an uplink block and a downlink block. Populating the burst frame may include identifying a largest unscheduled block pair, and appending one of the uplink block and the downlink block of the identified block pair to a shortest sub-frame string. The other of the uplink block and the downlink block may be appended to a diagonally opposed sub-frame string. The computer program product may also include instructions for determining if a conflict exists between the uplink block and the downlink block for each scheduled block pair.

One or more of the following features may also be included. The instructions for determining if a conflict exists may include instructions for determining if the uplink block and the downlink block of one of the plurality of block pairs at least partially overlap in the burst frame. If a conflict exists, the computer program product may include instructions for resolving the conflict and scheduling a next largest block pair. The instructions for resolving the conflict may include instructions for inserting a corresponding one of the uplink block and the downlink block at the beginning of the diagonally opposed sub-frame string, with the diagonally opposed sub-frame string appended thereto. The other of the uplink block and the downlink block may be appended to the shortest sub-frame string.

The computer program product may also include instructions for scheduling an unpaired uplink block or an unpaired downlink block after scheduling the plurality of block pairs. Additionally, the instructions for populating the burst frame may include instructions for determining the combined length of each of a plurality of block pairs. The instructions for determining the combined length of each of the plurality of block pairs may include instructions for arranging the block pairs according to a combined size of the uplink block the downlink block of each of the plurality of block pairs.

According to another implementation, a wireless system may include a wireless base station and at least one wireless subscriber station, the wireless base station and the at least one wireless subscriber station communicating with one another using a half-duplex frequency division duplex communication scheme. The wireless system may also include a burst scheduling module for scheduling uplink and downlink bursts, the burst scheduling module may be configured to populate a burst frame, having an uplink sub-frame and a downlink sub-frame, with at least the plurality of block pairs. Each block pair may include an uplink block and a downlink block. Populating the burst frame may include identifying a largest unscheduled block pair, and appending one of the uplink block and the downlink block of the identified block pair to a shortest sub-frame string. Populating the burst frame may also include appending the other of the uplink block and the downlink block to a diagonally opposed sub-frame string. The scheduling module may also be configured to determine if a conflict exists between the uplink block and the downlink block for each scheduled block pair.

One or more of the following features may also be included. The scheduling module of the wireless system, configured to determine if a conflict exists, may be further configured to determine if the uplink block and the downlink block of one of the plurality of block pairs at least partially overlap in the burst frame. The scheduling module may also be configured to, if a conflict exists, resolve the conflict and schedule a next largest block pair. To resolve the conflict, the scheduling module may be configured to insert a corresponding one of the uplink block and downlink block at the beginning of the diagonally opposed sub-frame string, with the diagonally opposed sub-frame string appended thereto. The other of the uplink block and the downlink block may be appended to the shortest sub-frame string.

The scheduling module may be further configured to schedule an unpaired uplink block or an unpaired downlink block after scheduling the plurality of block pairs. The scheduling module configured to determine the combined length of each of the plurality of block pairs may be further configured to arrange the block pairs according to a combined size of each uplink block and downlink block of each block pair.

In the wireless system, the scheduling module may be associated with the wireless base station. In one such embodiment, the scheduling module may include a computer program residing on a computer readable medium associated with the wireless base station.

The details of one or more implementations are set forth in the accompanying drawings and the description below. Other features and advantages will become apparent from the description, the drawings, and the claims.

DESCRIPTION OF THE DISCLOSURE

Figure 1:
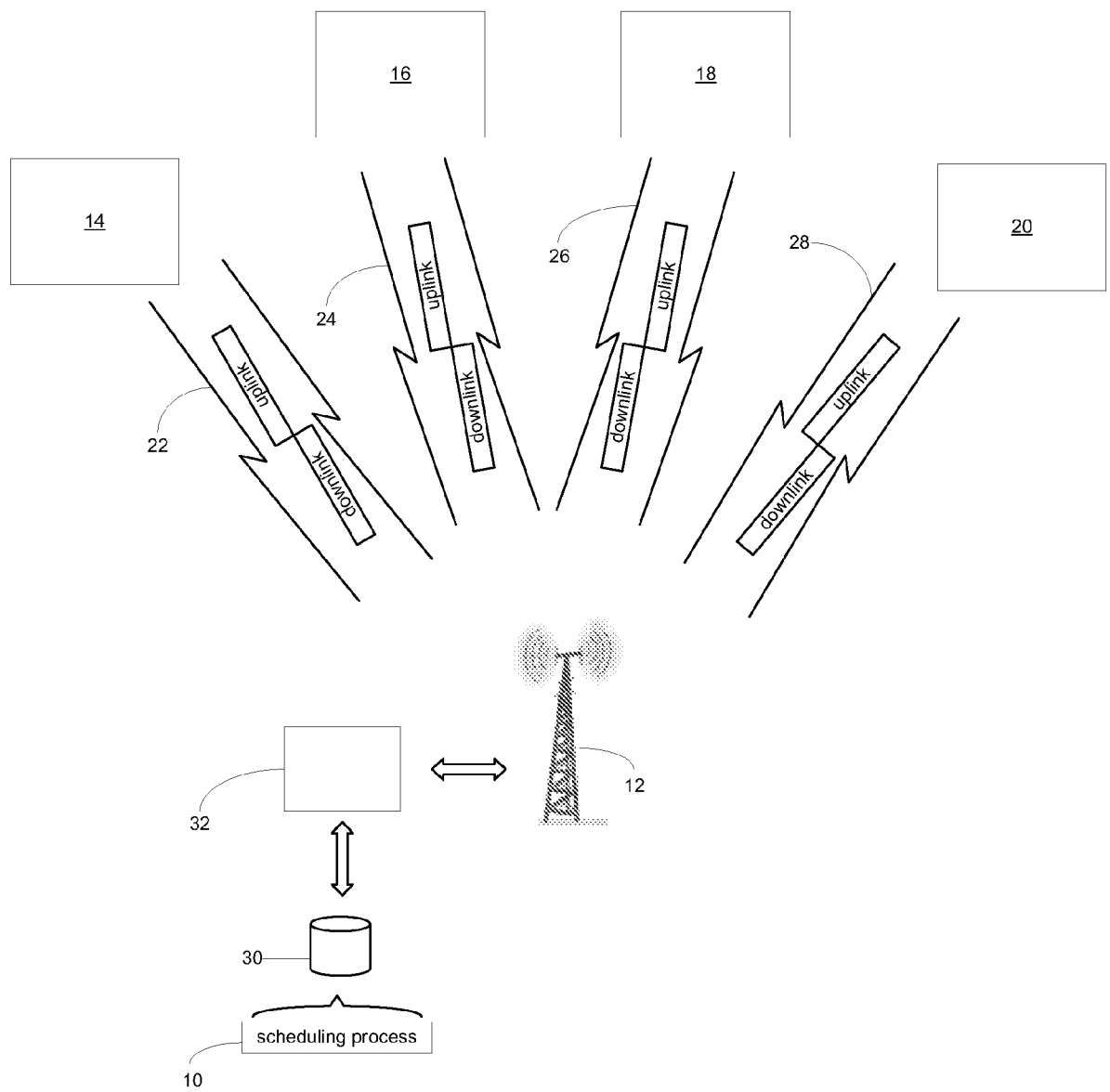
FIG. 1 diagrammatically depicts an H-FDD point to multi-point wireless network.

Referring to FIG. 1, there is shown a scheduling process 10 that may schedule, for example, wireless transmissions between one or more base stations (e.g., base station 12) and one or more subscriber stations (e.g., subscriber stations 14, 16, 18, 20) in a point to multi-point wireless network. As will be discussed in greater detail below, base station 12 and subscriber stations 14, 16, 18, 20 may communicate using a half-duplex frequency division duplex (H-FDD) scheme. Scheduling process 10 may schedule uplink and downlink transmissions between base station 12 and one or more subscriber stations 14, 16, 18, 20 to avoid conflicts between uplink and downlink transmissions between base station 12 and each of the respective subscriber stations 14, 16, 18, 20.

As mentioned, a point to multi-point wireless network may include base station 12 that may communicate with one or more subscriber stations 14, 16, 18, 20 via respective H-FDD communication channels 22, 24, 26, 28. Each H-FDD communication channel 22, 24, 26, 28 may include respective uplink and downlink sub-channels, providing frequency and time offset between uplink and downlink transmissions. The wireless network including base station 12 and subscriber stations 14, 16, 18, 20 may be a WiMAX wireless broadband network, e.g., as standardized by IEEE 802.16.

The instruction sets and subroutines of scheduling process 10, which may be stored on a storage device (e.g., storage device 30) coupled to a base station control system including a scheduling module (e.g., computer 32, dedicated hardware, etc.) may be executed by one or more processors (not shown) and one or more memory architectures (not shown) incorporated into the base station control system including the scheduling module (e.g., computer 32). The base station control system including the scheduling module (e.g., computer 32) may include an integrated processor of base station 12. Alternatively/additionally, the scheduling module may be a separate computing and/or control system associated with base station 12.

Storage device 30 may include, but is not limited to: a hard disk drive; a tape drive; an optical drive; a RAID array; a random access memory (RAM); or a read only memory (ROM). The instruction sets and subroutines of scheduling process 10 may alternatively be stored on one or more additional storage devices (not shown) directly, or indirectly, coupled to computer 32.

Figure 2:
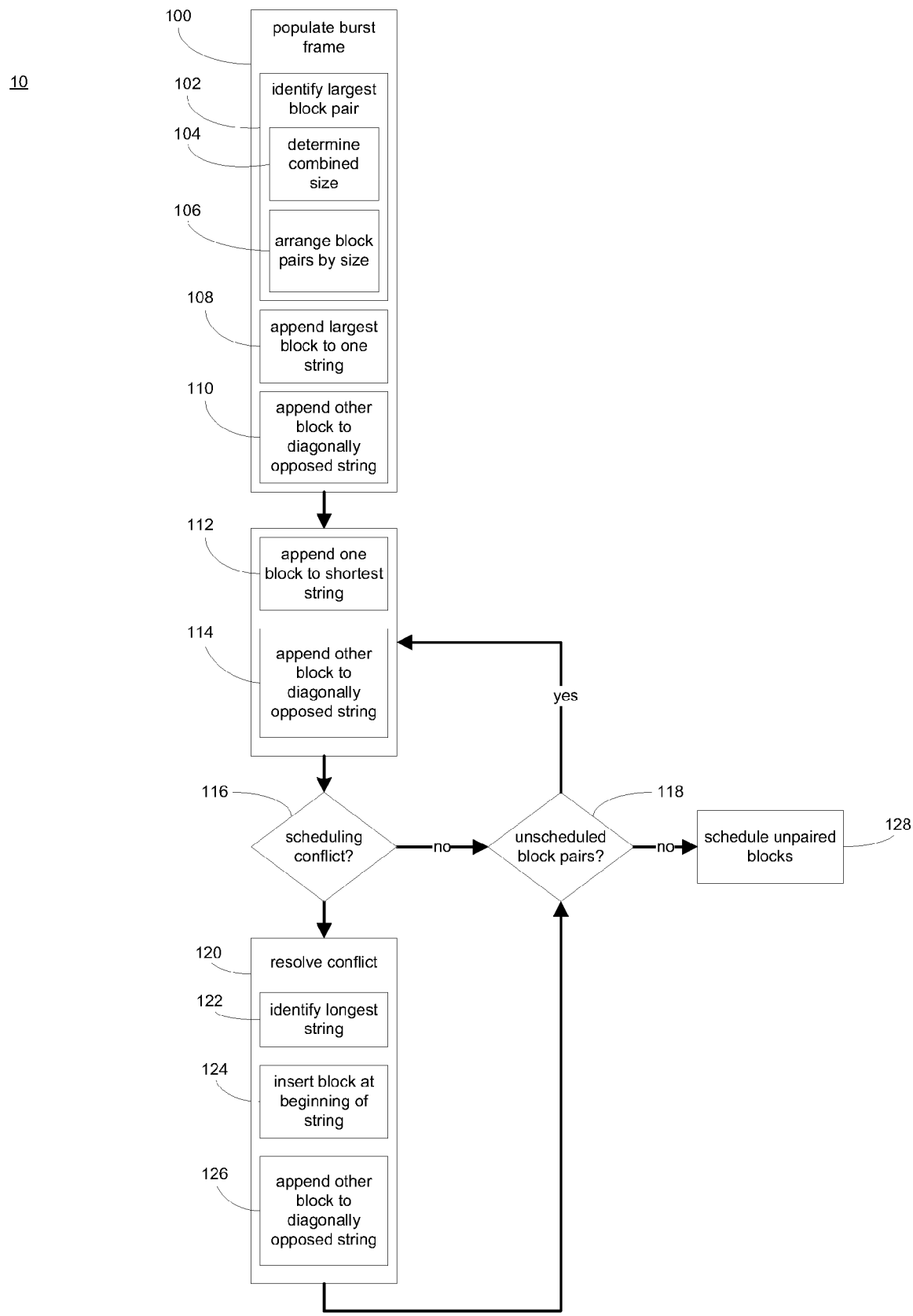
FIG. 2 is a flowchart of an H-FDD scheduling process.
Figure 3:
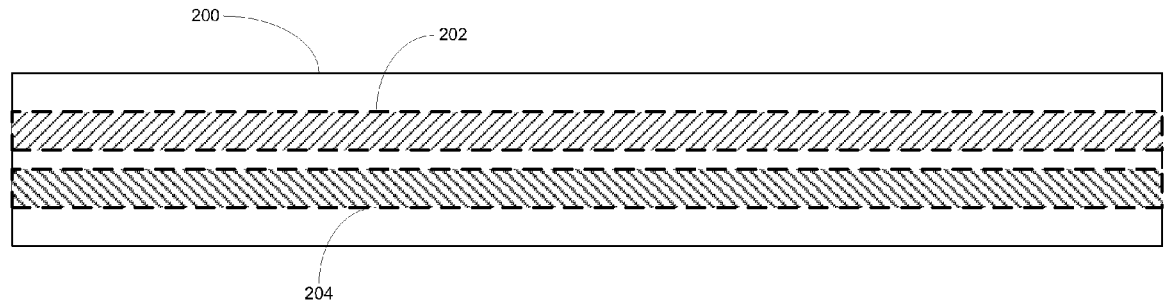
FIG. 3 diagrammatically depicts an H-FDD burst frame including a downlink sub-frame and an uplink sub-frame.

Referring also to FIG. 2, scheduling process 10 may populate 100 burst frame 200 (shown in FIG. 3) with transmission bursts including uplink and downlink transmissions between base station 12 and subscriber stations 14, 16, 18, 20. Burst frame 200 may include downlink sub-frame 202 and uplink sub-frame 204. Downlink sub-frame 202 may be provided for scheduling downlink transmissions from base station 12 to one or more subscriber station 14, 16, 18, 20. Similarly, uplink sub-frame 204 may be provided for scheduling uplink transmissions from one or more subscriber station 14, 16, 18, 20 to base station 12. As mentioned above, downlink and uplink transmissions to and from respective subscriber stations 14, 16, 18, 20 may be scheduled to avoid conflicts, e.g., time-wise overlap of uplink and downlink transmissions for a given subscriber station. That is, downlink and uplink transmissions may be scheduled such that each subscriber station 14, 16, 18, 20 may only receive downlink transmissions from base station 12 or transmit uplink transmissions to base station 12 at any given time.

Figure 4:
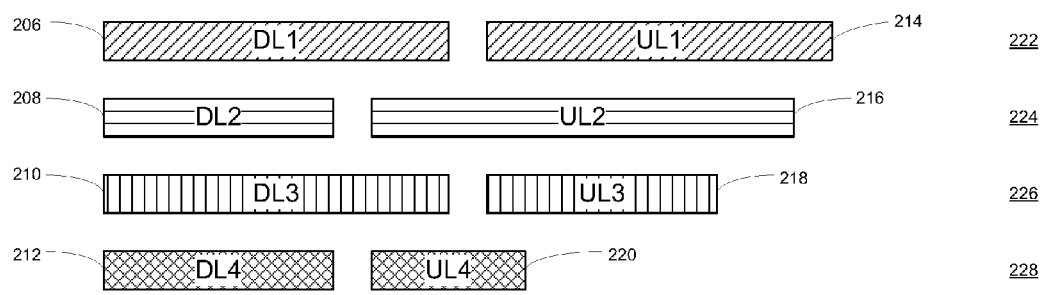
FIG. 4 diagrammatically depicts a plurality of downlink and uplink blocks to be scheduled for transmission.

With additional reference also to FIG. 4, downlink transmission bursts (e.g., downlink blocks 206, 208, 210, 212) to respective subscriber stations 14, 16, 18, 20 and uplink transmission bursts (e.g., uplink blocks 214, 216, 218, 220) from respective subscriber stations 14, 16, 18, 20 may be scheduled in burst frame 200. Each downlink/uplink block pair 222, 224, 226, 228 may provide bidirectional communication between base station 12 and each respective subscriber stations 14, 16, 18, 20. One or more unpaired downlink and uplink blocks (not shown) may occur in the case of only one directional communication between base station 12 and one or more subscriber station 14, 16, 18, 20 within the given time frame of the transmission burst associated with burst frame 200. For example, in a given transmission burst frame, a subscriber station may not require an uplink transmission, but may receive a downlink transmission from base station 12.

Scheduling process 10 may populate 100 burst frame 200 by scheduling downlink blocks 206, 208, 210, 212 and uplink blocks 214, 216, 218, 220 in respective downlink sub-frame 202 and uplink sub-frame 204. As mentioned above, downlink blocks 206, 208, 210, 212 and uplink blocks 214, 216, 218, 220 may be scheduled to avoid conflicts between downlink block 206, 208, 210, 212 and uplink block 214, 216, 218, 220 of each block pair 222, 224, 226, 228, thereby avoiding the situation in which one or more subscriber station 14, 16, 18, 20 may be required to both transmit and receive at the same time.

The length of each block pair 222, 224, 226, 228 (i.e., the sum of each downlink block 206, 208, 210, 212 and respective uplink block 214, 216, 218, 220 for each subscriber station 14, 16, 18, 20) may not exceed the length of burst frame 200. That is, the size of each block pair 222, 224, 226, 228 may not exceed a length that would result in a scheduling conflict between respective downlink block 206, 208, 210, 212 and uplink block 121, 216, 218, 220 in burst frame 200. Additionally, the total size of block pairs 222, 224, 226, 228 may not exceed the size of burst frame 200.

To populate 100 burst frame 200, scheduling process 10 may identify 102 the largest block pair. In order to identify 102 the largest of block pairs 222, 224, 226, 228, scheduling process 10 may determine 104 the combined size of downlink block 206, 208, 210, 212 and uplink block 214, 216, 218, 220 of each block pair 222, 224, 226, 228. The size of each uplink block 214, 216, 218, 220 may be known, for example, from bandwidth requests from subscriber stations 14, 16, 18, 20.

Continuing with the above-stated example, as shown in FIG. 4, block pair 222 may be the largest, followed in descending order by block pair 216 and block pair 218, with block pair 220 being the smallest. While not necessary, scheduling process 10 may arrange 106 block pairs 222, 224, 226, 228 by size, as shown in FIG. 4.

Figure 5:
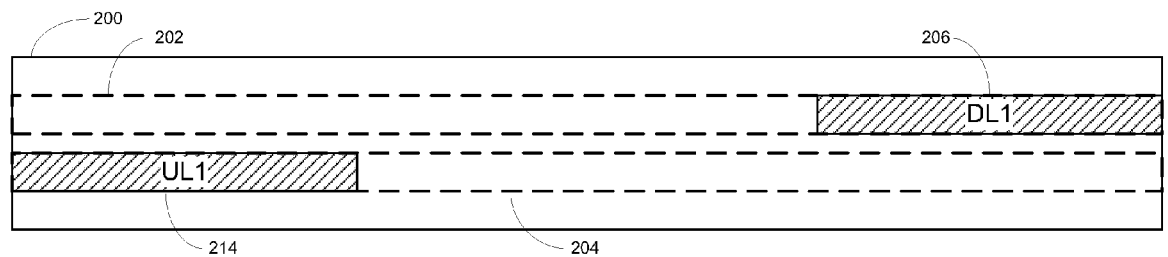
FIG. 5 depicts a first downlink and uplink block pair scheduled in the burst frame.

In order to populate 100 burst frame 200, scheduling process 10 may append 108 one block (e.g., downlink block 206) of the largest unscheduled block pair (i.e., block pair 222) to the shortest sub-frame string in burst frame 200 and may append 110 the other block (e.g., uplink block 214) of the largest unscheduled block pair to the diagonally opposed sub-frame string in burst frame 200. For example, as shown in FIGS. 4 and 5, the largest unscheduled block pair 222 may include downlink block 206 and uplink block 214. Beginning with burst frame 200 completely unpopulated, downlink sub-frame 202 and uplink sub-frame 204 do not include any sub-frame strings (i.e., strings of blocks scheduled in a sub-frame), therefore, downlink block 206 and uplink block 214 may be appended 108, 110 to downlink sub-frame 202 and uplink sub-frame 204 in any sub-frame edge and corresponding diagonally opposed sub-frame corner. In the illustrated example, downlink block 206 may be placed in the right hand side of downlink sub-frame 202, and uplink block 214 may be placed in the left hand side of uplink sub-frame 204, i.e., in the diagonally opposed position relative to downlink block 206. Scheduling the first block pair (i.e., block pair 222) may not result in a conflict because the length of the block pair may not exceed the total length of burst frame 200.

Figure 6:
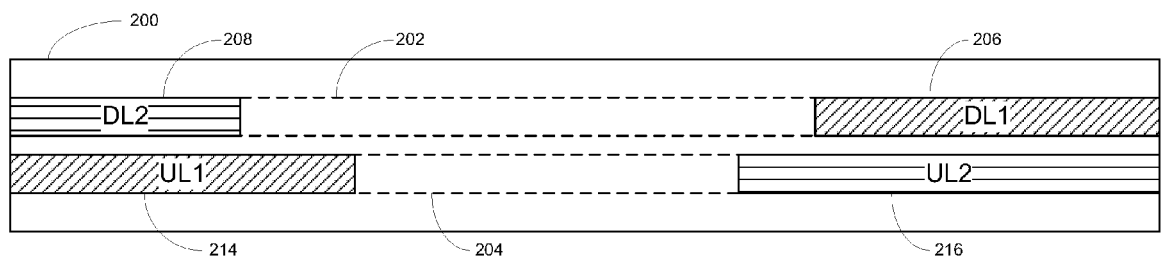
FIG. 6 diagrammatically depicts a second downlink and uplink block pair scheduled in the burst frame.

Scheduling process 10 may continue to populate the burst frame with remaining unscheduled block pairs 224, 226, 228. Remaining block pairs 224, 226, 228 may be scheduled according to size, in random order, or according to various other schemes. Continuing with the above-stated example, if remaining block pairs 224, 226, 228 are arranged according to descending size, block pair 224 (i.e., the largest unscheduled block pair) may be scheduled next. Scheduling process 10 may append 112, 114 downlink and uplink blocks 208, 216 to the least filled sub-frame string and the diagonally opposed sub-frame string. As shown in FIG. 6, downlink block 206 has been scheduled in the right hand side of downlink sub-frame 202 and uplink block 214 has been scheduled in the left hand side of uplink sub-frame 204. As such, the left hand side of downlink sub-frame 202 and the right hand side of uplink sub-frame 204 include the least populated sub-frame strings. Scheduling process may, therefore, respectively append 112, 114 downlink and uplink blocks 208, 216 in the left hand side of downlink sub-frame 202 and the right hand side of uplink sub-frame 204.

Figure 7:
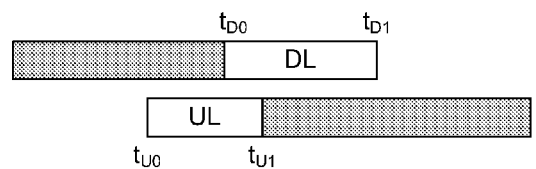
FIG. 7 diagrammatically depicts a conflict situation.
Figure 8:
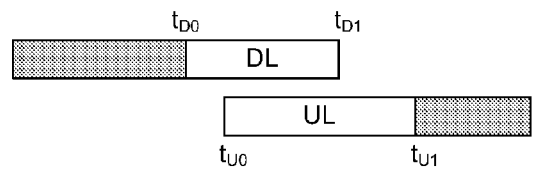
FIG. 8 diagrammatically depicts another conflict situation.
Figure 9:
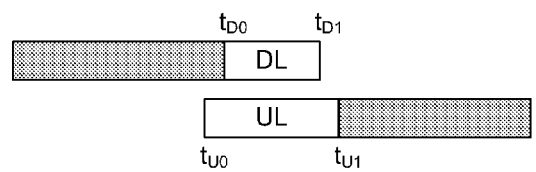
FIG. 9 diagrammatically depicts yet another conflict situation.

Scheduling process 10 may determine 116 if a conflict exists between downlink block 206 and uplink block 214. Referring to FIGS. 7 through 9, conflict situations are diagrammatically depicted. Generally, a conflict may exist when the downlink and uplink block of a given block pair at least partially overlap in the downlink sub-frame and uplink sub-frame. In such a situation, a given subscriber station would be required to both transmit and receive at the same time, which may not be possible for a subscriber station operating in half duplex mode.

As shown in FIGS. 7 through 9 respectively, a conflict between downlink block DL, which may be scheduled in a time slot having relative begin and end transmit times $t_{D0}$ and $t_{D1}$, and a corresponding uplink block UL, which may be scheduled in time slots having relative begin and end transmit times $t_{U0}$ and $t_{U1}$, may occur in the following situations:

$(t_{D0} <= t_{U1}$ And $t_{U1} <= t_{D1})$ Or $(t_{D0} <= t_{U0}$ And $t_{U0} <= t_{D1})$ Or $(t_{U1} > t_{D1}$ And $t_{U0} < t_{D0})$.

Given the above relationships between relative begin and end transmit times of downlink block DL and uplink block UL, scheduling process 10 may determine 116 if a conflict will exist for each block pair 222, 224, 226, 228 prior to scheduling. That is, scheduling process 10 may determine 116 if a conflict exists before populating 100 burst frame 200 with each block pair 222, 224, 226, 228, based on respective begin and end transmit times. Alternatively/additionally, scheduling process 10 may determine if a conflict exists after populating burst frame 200 with each block pair 222, 224, 226, 228.

If no conflict exists, scheduling process 10 may determine 118 if any unscheduled block pairs remain. Continuing with the above-stated example, block pairs 226, 228 have yet to be scheduled. If scheduling process 10 determines 118 that unscheduled block pairs 226, 228 remain, scheduling process 10 may continue to populate burst frame 200 with the remaining unscheduled block pairs 226, 228.

Figure 10:
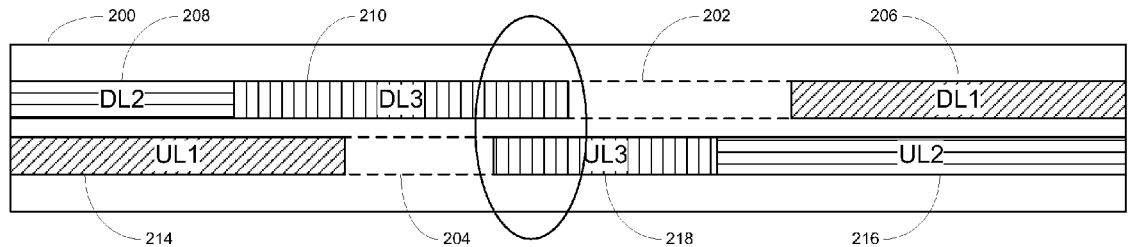
FIG. 10 diagrammatically depicts a conflict between a third downlink and uplink block pair scheduled in the burst frame.

Scheduling process 10 may populate burst frame 200 with one of remaining block pairs 226, 228. Continuing with the above-stated example, scheduling process may next schedule e.g., block pair 226. Scheduling process 10 may append 112 one of downlink block 210 and uplink block 218 to the shortest sub-frame string. Continuing with the above-stated example, the left hand side of downlink sub-frame 202 includes the shortest sub-frame string, e.g., based on the relative length of the scheduled downlink and uplink blocks 206, 208, 214, 216. Scheduling process 10 may append 112 downlink block 210 to the shortest sub-frame string, i.e., may append 112 downlink block 210 to the sub-frame string on the left hand side of downlink sub-frame 202, and may append 114 uplink block 218 to the diagonally opposed sub-frame string, i.e., to the sub-frame string on the right hand side of uplink sub-frame 204, as shown in FIG. 10.

Scheduling process 10 may determine 116 that a conflict exists between downlink block 210 and uplink block 218. As shown in FIG. 10, as scheduled, downlink block 210 and uplink block 218 at least partially overlap, with $t_{D0} <= t_{U0}$ AND $t_{U0} <= t_{D1}$, as described with reference to FIG. 8 above. As noted above, scheduling process 10 may determine 116 that a conflict exists prior to scheduling downlink block 210 and uplink block 218 in burst frame 200, rather than after scheduling downlink block 210 and uplink block 218 (e.g., based on begin and end transmit times of downlink block 210 and uplink block 218)

Having determined 116 that a conflict exists, scheduling process 10 may resolve 120 the conflict. To resolve 120 the conflict, scheduling process 10 may identify 122 the longer sub-frame string, not including the size of conflicting block pair 226, of the two conflicting diagonals. The longer sub-frame string of the two diagonals is the sub-frame string diagonally opposed to the shortest sub-frame string of burst frame 200, identified for scheduling block pair 226, as described above. In the illustrated embodiment, the longer of the sub-frame strings is on the right hand side of uplink sub-frame 204, including uplink block 216. If the sub-frame strings are the same length (i.e., there is no longer sub-frame string) one of the sub-frame strings may be arbitrarily selected.

Figure 11:
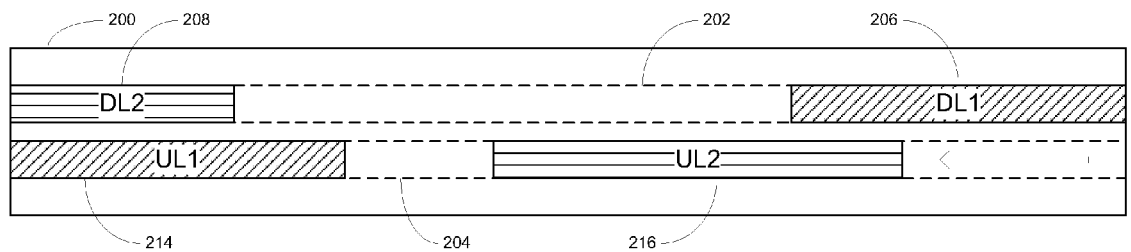
FIG. 11 diagrammatically depicts a conflict resolution process.

Scheduling process 10 may insert 124 the conflicting block of the corresponding sub-frame, i.e., uplink block 218, at the beginning of the longer of the sub-frame strings. The remainder of the longer sub-frame string may be appended to uplink block 218, which may be positioned at the beginning of the sub-frame string. As shown in FIG. 11, at least conceptually, inserting uplink block 218 at the beginning of the longer of the sub-frame strings may include sliding the longer of the sub-frame strings toward the opposite end of uplink sub-frame 204 to allow uplink block 218 to be inserted at the beginning of the sub-frame string.

Figure 12:
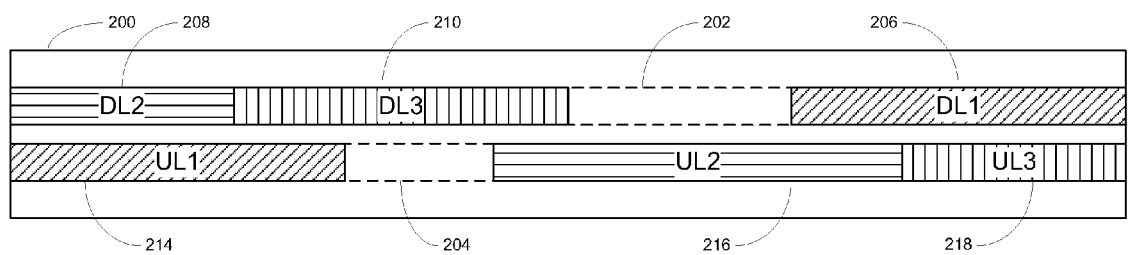
FIG. 12 diagrammatically depicts the third downlink and uplink block pair scheduled in the burst frame to eliminate the conflict.

Scheduling process 10 may append 126 the other block of block pair 226, i.e., downlink block 210, to the shorter of the diagonally opposed sub-frame strings, as shown in FIG. 12. As noted above, the shorter of the diagonally opposed sub-frame strings is the shortest of the sub-frame strings of burst frame 200, identified for scheduling block pair 226. Downlink block 210 may now partially overlap uplink block 216 rather than uplink block 218. The available time slots in downlink sub-frame 202 and uplink sub-frame 204, in which additional block pairs, e.g., block pair 228, may be scheduled do not overlap one another. As such, later scheduled block pairs cannot conflict.

Figure 13:
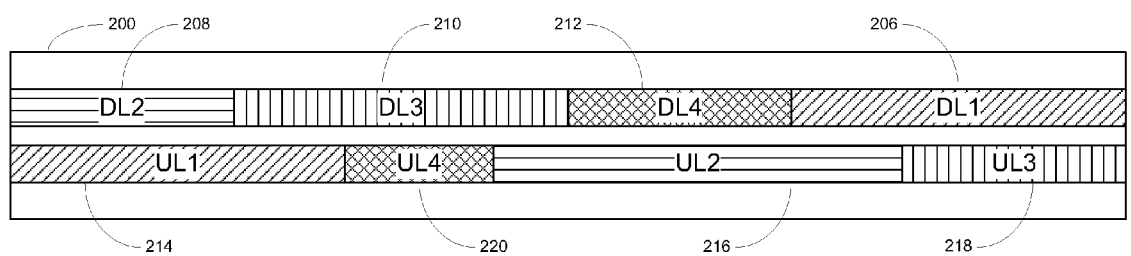
FIG. 13 diagrammatically depicts a fourth downlink and uplink block pair scheduled in the burst frame.

Once the conflict has been resolved, scheduling process 10 may determine 118 if there are any remaining unscheduled block pairs, e.g., block pair 228. Scheduling process 10 may continue to populate burst frame 200 (i.e., schedule remaining unscheduled block pair 228) as described above. For example, scheduling process may append 112 one of downlink block 212 and uplink block 220 to the shortest sub-frame string. In the illustrated example of FIG. 12, the sub-frame string on the right hand side of downlink sub-frame 202 and the sub-frame string on the left hand side of uplink sub-frame 204 are equally short. Therefore, scheduling process 10 may append 112 either downlink block 212 or uplink block 220 to the corresponding sub-frame string. Scheduling process 10 may append 114 the other of downlink block 212 and uplink block 220 to the diagonally opposed sub-frame string, as shown in FIG. 13.

Scheduling process 10 may determine 118 if there are any remaining unscheduled block pairs. In the illustrated example, no unscheduled block pairs remain. If any unpaired blocks remain, scheduling process 10 may then schedule 128 any unpaired downlink and uplink blocks. Unpaired blocks may be scheduled in the respective downlink or uplink sub-frame 202, 204 in any order.

Base station 12 may broadcast the scheduling of downlink and uplink blocks 206, 208, 210, 212, 214, 216, 218, 220 to the various subscriber stations in the network, e.g., subscriber stations 14, 16, 18, 20. Additionally/alternatively, base station 12 may broadcast individual uplink times to respective subscriber stations 14, 16, 18, 20. For example, in a WiMAX wireless broadband network, which may comply with IEEE 802.16, base station 12 may broadcast at least a portion of the uplink and downlink transmitting schedule to subscriber stations 14, 16, 18, 20 at the beginning of every frame. As such, uplink and downlink transmissions may be coordinated to prevent conflicts in subscriber stations operating in half duplex mode.

It should be understood that, although the foregoing description has been presented in the context of scheduling H-FDD downlink and uplink transmissions in a point to multi-point wireless network, the scheduling method can be adapted to other more general applications. In general, the described method may be useful for avoiding conflicts in an arbitrary dimension (e.g., time, frequency, code, color, length, mass, and so forth), e.g., when two or more entities must share in non-overlapping fashion between two well-defined states.

It is to be understood that the foregoing description is intended to illustrate and not to limit the scope of the invention.

What is claimed is:

1. A method comprising:
    populating a burst frame having an uplink sub-frame and a downlink sub-frame with at least a plurality of block pairs, each block pair including an uplink block and a down link block, populating the burst frame including:
        identifying a largest block pair,
        appending one of the uplink block and the downlink block of the largest block pair to a sub-frame string, and
        appending the other of the uplink block and the downlink block to a diagonally opposed sub-frame string;
        appending one of an unscheduled uplink block and an unscheduled downlink block of an unscheduled block pair to a shortest sub-frame string;
        appending the other of the unscheduled uplink block and unscheduled downlink block of the unscheduled block pair to a sub-frame string diagonally opposed to the shortest sub-frame string, and
        determining if a conflict exists between the unscheduled uplink block and the unscheduled downlink block.

2. The method of claim 1 wherein determining if a conflict exists includes determining if the unscheduled uplink block and the unscheduled downlink block of the unscheduled block pair at least partially overlap in the burst frame.

3. The method of claim 1, further including, if a conflict exists, resolving the conflict and scheduling a next unscheduled block pair of the plurality of block pairs, wherein resolving the conflict includes inserting a corresponding one of the unscheduled uplink block and the unscheduled downlink block at a beginning of the sub-frame string diagonally opposed to the shortest sub-frame string, with the sub-frame string diagonally opposed to the shortest sub-frame string appended to the inserted corresponding one of the unscheduled uplink block and the unscheduled downlink block, and appending the other of the unscheduled uplink block and the unscheduled downlink block to the shortest sub-frame string.

4. The method of claim 1, further comprising scheduling an unpaired uplink block or an unpaired downlink block after scheduling the plurality of block pairs.

5. The method of claim 1, further including determining the combined length of the uplink block and the downlink block of each of the plurality of block pairs.

6. The method of claim 5, wherein determining the combined length of the uplink block and the downlink block of each of the plurality of block pairs includes arranging the plurality of block pairs according to the combined length.

7. A computer program product residing on a non-transitory computer readable storage medium having a plurality of instructions stored thereon that, when executed by a processor, cause the processor to perform operations comprising:
   populating a burst frame having an uplink sub-frame and a downlink sub-frame with at least a plurality of block pairs, each block pair including an uplink block and a downlink block, populating the burst frame including:
      identifying a largest unscheduled block pair,
      appending one of the uplink block and the downlink block of the identified block pair to a shortest sub-frame string, and
      appending the other of the uplink block and the downlink block to a diagonally opposed sub-frame string; and
   determining if a conflict exists between the uplink block and the downlink block for each scheduled block pair.

8. The computer program product of claim 7, wherein the instructions for determining if a conflict exists include instructions for determining if the uplink block and the downlink block of one of the plurality of block pairs at least partially overlap in the burst frame.

9. The computer program product of claim 7, further including instructions for, if a conflict exists, resolving the conflict and scheduling a next largest block pair of the plurality block pairs, the instructions for resolving the conflict including instructions for inserting a corresponding one of the uplink block and the downlink block at the beginning of the diagonally opposed sub-frame string, with the diagonally opposed sub-frame string appended thereto, and appending the other of the uplink block and the downlink block to the shortest sub-frame string.

10. The computer program product of claim 7, further comprising instructions for scheduling an unpaired uplink block or an unpaired downlink block after scheduling the plurality of block pairs.

11. The computer program product of claim 7, further comprising instructions for determining the combined length of the uplink block and the downlink block of each of a plurality of block pairs.

12. The computer program product of claim 11, wherein the instructions for determining the combined length of the uplink block and the downlink block of each of the plurality of block pairs includes instructions for arranging the block pairs according to the combined length.

13. A wireless system comprising:
   a wireless base station and at least one wireless subscriber station, the wireless base station and the at least one wireless subscriber station communicating with one another using a half-duplex frequency division duplex communication scheme;
   a burst scheduling module for scheduling uplink and downlink bursts, the burst scheduling module configured to:
      populate a burst frame having an uplink sub-frame and a downlink sub-frame with at least a plurality of block pairs, each block pair including an uplink block and a downlink block, populating the burst frame including:
      identifying a largest unscheduled block pair,
      appending one of the uplink block and the downlink block of the identified block pair to a shortest sub-frame string, and
      appending the other of the uplink block and the downlink block to a diagonally opposed sub-frame string; and
      determine if a conflict exists between the uplink block and the downlink block for each scheduled block pair.

14. The wireless system of claim 13, wherein the scheduling module configured to determine if a conflict exists, is further configured to determine if the uplink block and the downlink block of one of the plurality of block pairs at least partially overlap in the burst frame.

15. The wireless system of claim 14, wherein the scheduling module is further configured to, if a conflict exists, resolve the conflict and schedule a next largest block pair of the plurality of block pairs, wherein, to resolve the conflict, the scheduling module is configured to insert a corresponding one of the uplink block and downlink block at the beginning of the diagonally opposed sub-frame string, with the diagonally opposed sub-frame string appended thereto, and append the other of the uplink block and the downlink block to the shortest sub-frame string.

16. The wireless system of claim 13, wherein the scheduling module is further configured to schedule an unpaired uplink block or an unpaired downlink block after scheduling the plurality of block pairs.

17. The wireless system of claim 13, wherein the burst scheduling module is further configured to determine the combined length of the uplink block and the downlink block of each of the plurality of block pairs.

18. The wireless system of claim 17, wherein the scheduling module configured to determine the combined length of the uplink block and the downlink block of each of the plurality of block pairs is further configured to arrange the plurality of block pairs according to the combined length.

19. The wireless system of claim 13, wherein the scheduling module is associated with the wireless base station.

20. The wireless system of claim 19, wherein the scheduling module includes a computer program residing on a computer readable medium associated with the wireless base station.

* * * * *